United States Patent

Gilbert

[15] 3,636,464

[45] Jan. 18, 1972

[54] DC AMPLIFIER POWER-LIMITED OUTPUT STAGE

[72] Inventor: Edward O. Gilbert, Ann Arbor, Mich.

[73] Assignee: Reliance Electric Company, Ann Arbor, Mich.

[22] Filed: May 8, 1969

[21] Appl. No.: 822,982

Related U.S. Application Data

[62] Division of Ser. No. 471,790, July 9, 1965, Pat. No. 3,462,697.

[52] U.S. Cl. ....................330/24, 330/26

[51] Int. Cl. ....................H03f 3/04, H03f 3/68

[58] Field of Search....................330/26, 28, 89, 32, 18, 24, 330/20, 16

[56] References Cited

UNITED STATES PATENTS

| | | | |
|---|---|---|---|
| 2,916,565 | 12/1959 | Ensink et al. | 330/28 X |
| 3,195,064 | 7/1965 | Offner | 330/13 |
| 3,237,117 | 2/1966 | Gollings et al. | 330/18 X |
| 3,358,241 | 12/1967 | Hull | 330/15 |
| 3,436,667 | 4/1969 | Kedson | 330/9 |

*Primary Examiner*—Nathan Kaufman
*Attorney*—Richard G. Stephens

[57] ABSTRACT

A direct-coupled amplifier output stage includes a pair of series-connected output transistors. The input signal from prior stages is applied to the base of one of the series transistors and the output signal is taken from in between the two transistors. A separate protective transistor is associated with each of the two series-connected transistors. Each protective transistor provides an opposing signal to the series transistor which it protects in opposition to the drive signal so as to limit the current through the series transistor. Each protective transistor is controlled to provide its opposing signal not only in accordance with the current through the series transistor which it is protecting, but also in accordance with the voltage across the series transistor which it is protecting, so that both of the series transistors are "power limited." Thus the output stage can safely supply more output current when it is providing a low-output voltage than when it is supplying a larger output voltage.

3 Claims, 1 Drawing Figure

PATENTED JAN 18 1972
3,636,464
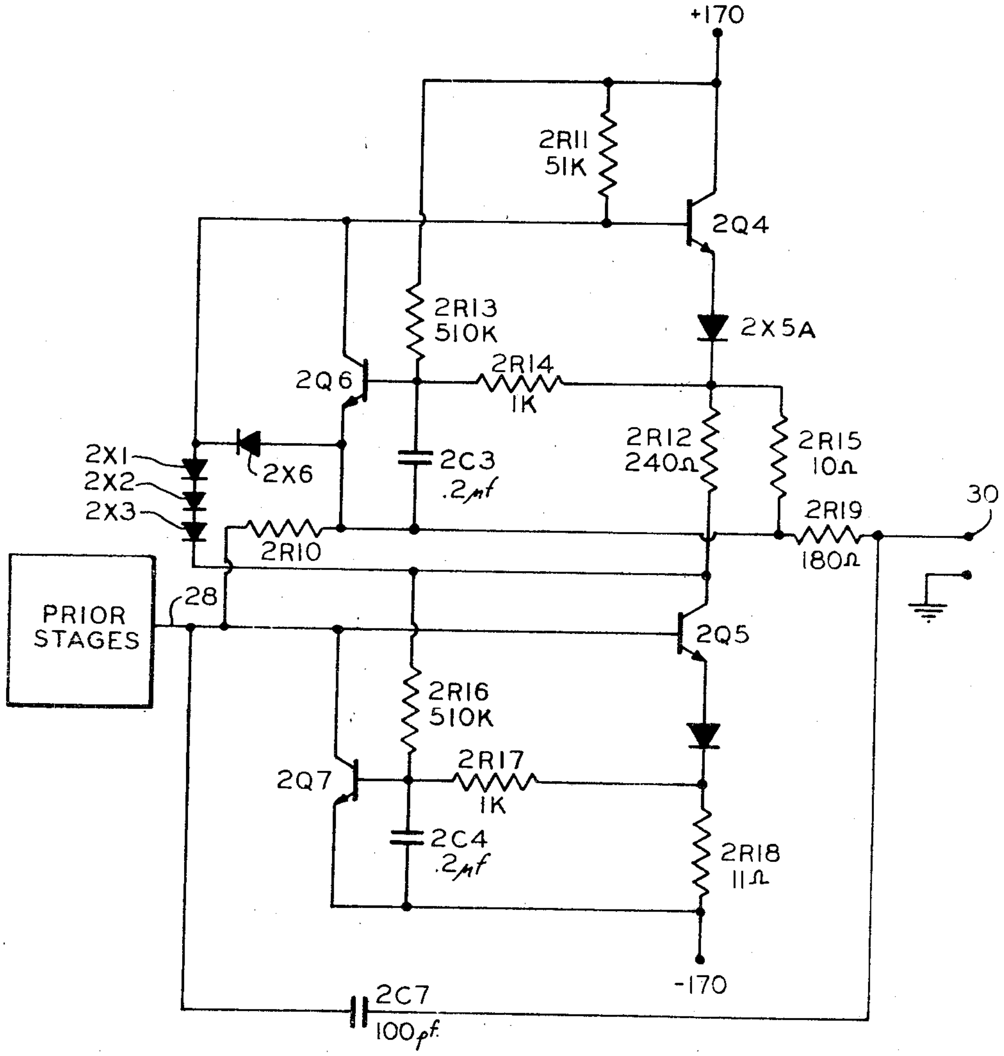
INVENTOR.
BY

DC AMPLIFIER POWER-LIMITED OUTPUT STAGE

This application is a division of my prior copending Ser. No. 471,790 filed July 9, 1965, now U.S. Pat. No. 3,462,697 issued Aug. 19, 1969, and that patent illustrates in great detail a complete drift-stabilized direct-coupled feedback operational amplifier, including the improved power output stage of the present invention. In order to understand the present invention a detailed description of the entire stabilized amplifier is unnecessary, it being merely necessary to understand that one or more prior stages receive an input signal and apply an output signal to the output stage, which includes a pair of series-connected output transistors, and a protective transistor associated with each of the two series-connected transistors. For further details and a discussion of various problems associated with direct-coupled amplifiers, reference may be had to U.S. Pat. No. 3,462,697. The present invention incorporates an output stage which draws little idle current yet allows very substantial load currents to be drawn with output voltages of both polarities. A novel current-limiting circuit feature makes the use of fuses absolutely unnecessary to protect the amplified output stage, even if the output terminal is accidentally patched to a power supply terminal. Though sufficiently rapidly acting to prevent amplifier damage under such conditions, the current limiting arrangement will still allow peak currents for short intervals so that substantial capacitive loads may be charged effectively. To utilize an increased amount of the permissible operating area of the amplifier power transistors, the current levels at which limiting of the current through a power transistor begins are made to vary automatically as a function of the power across each power transistor as well as the current through each power transistor.

Thus it is a primary object of the present invention to provide an improved direct-coupled amplifier output stage having current limit protection wherein the current level at which limiting of the current through a power transistor beings is made to vary automatically as a function of the voltage across the power transistor as well as the current through the power transistor.

It is another object of the invention to provide such an output stage which can nevertheless supply large peak currents for limited times so as to be suitable for driving capacitive loads.

Other objects of the invention will in part be obvious and will, in part, appear hereinafter.

The invention accordingly comprises the features of construction, combination of elements, and arrangement of parts which will be exemplified in the constructions hereinafter set forth, and the scope of the invention will be indicated in the claims.

For a fuller understanding of the nature and objects of the invention, reference should be had to the following detailed description taken in connection with the accompanying drawings, in which the single FIGURE is an electrical schematic diagram of an exemplary amplifier output stage constructed in accordance with the present invention.

The amplifier output stage comprises a series-connected transistor pair configuration which draws a modest idle current yet allows fairly heavy loads to be driven in either direction, together with unique current-limiting protection which makes fuses unnecessary to protect the amplifier. Most prior art computer transistor amplifiers incorporate fuses to prevent amplifier damage if the amplifier output terminal is incorrectly patched to a voltage source. Replacement of the fuses can be irksome and time-consuming.

The input signal to the amplifier output stage is applied to the output stage via line 28, from prior stages shown for convenience as a simple block. In the circuit shown, transistors 2Q5 and 2Q4 are connected in a series arrangement to allow heavy loads in either direction. Transistors 2Q4 and 2Q5 form a basic output stage which is the transistor equivalent of the vacuum tube output stage shown and described at pp. 91–94 of "Design Fundamentals of Analog Computer Components" by R. M. Howe, (D. Van Nostrand, New York 1961). When the output signal on line 30 is very negative, transistor 2Q5 operates as a common emitter stage in which the amplifier load (connected to line 30 and not shown) is the main transistor load resistance, and the load current flows to the negative power supply. The voltage across resistor 2R18 will be seen to be proportional to and a measure of the current passing through the collector-emitter circuit of transistor 2Q5. With output terminal 30, the 2Q5 collector negative, and sufficient load current through 2R12, the transistor 2Q4 base, which is connected to the 2Q5 collector through series diodes 2X1, 2X2 and 2X3, is also negative relative to its emitter, and transistor 2Q4 is cut off. Diode **2X5*a* clamps the 2Q4 base to prevent it from going too far negative, both to protect the transistor and to prevent delay due to recovery from an over-biased condition. When the output signal on line 30 is very positive, transistor 2Q4 acts as an emitter follower, and load current flows from the positive supply source through 2Q4 to terminal 30 and the external load (not shown), with the base drive input to transistor 2Q4 coming from the 2Q5 collector through diodes 2X1, 2X2 and 2X3. Under these conditions, the voltage across resistor 2R15 will be seen to be proportional to and a measure of the current passing through the collector-emitter circuit of transistor 2Q4. Feedback through resistor 2R10 tends to make circuit operation independent of transistor characteristics, such feedback generally having been unnecessary in similar vacuum tube output stages. Transistor 2Q7 is a protective transistor which protects power transistor 2Q5 of the series-pair, and transistor 2Q6 is a protective transistor which similarly protects power transistor 2Q4 of the series pair. When a heavy load is required with a negative output voltage, the current flowing through the collector-emitter circuit of transistor 2Q5 is sensed by sensing the voltage across a small series resistor 2R18. The voltage across resistor 2R18, which is manifestly proportional to the current flowing through the collector-emitter circuit of transistor 2Q5, is applied via a low-pass fiber (2C4 and 2R17) to control transistor 2Q7. If the current through 2Q5 and 2R18 begins to exceed a limit amount, transistor 2Q7 diverts input drive current on line 28 from the base of transistor 2Q5, thereby preventing any increased amount of current from being drawn through 2Q5. The low-pass filter delays operation of transistor 2Q7 to allow a momentary peak current which is frequently required when driving a capacitive load. For example, a load of 200 ma. might be tolerated for perhaps 200 microseconds, while a steady load might not be allowed to exceed 40 milliamperes, for example. Because of the gain in transistors 2Q7 and 2Q5, the limiting characteristic provided by the transistor 2Q7** circuit may be made quite flat.

The current through the collector-emitter circuit of transistor 2Q4 during positive outputs is similarly sensed by resistor 2R15 and applied via a low-pass filter (2R14, 2C3) to control transistor 2Q6, which similarly diverts base current from 2Q4 to limit the current through 2Q4. The control of a protective transistor such as 2Q6 or 2Q7 in accordance with the current through a power transistor which it is intended to protect is not in itself new. However, in accordance with a central concept of the present invention, each of the protective transistors is controlled not only by the current through the collector-emitter of the power transistor which it is protecting, but in addition by the voltage existing across the collector-emitter circuit of the power transistor which it is protecting. In both limiter circuits, the current limit point is advantageously varied as a function of the voltage across the transistor being limited, so that each transistor is, in effect, power limited. Resistor 2R16 varies the limit point of transistor 2Q7 as a function of the voltage across power transistor 2Q5, and resistor 2R13 similarly varies the limit point of transistor 2Q4 as a function of the voltage across power transistor 2Q4.

Thus it will be seen that by the simple expedient of adding resistors 2R13 and 2R16, the two-power transistors may be protected so that limiting occurs only when the power being dissipated starts to exceed a desired limit, so that more efficient use of the power-handling capability of such transistors is made. While specific values and devices are shown, they are in no means restrictive and values and devices may be varied widely by those skilled in the art. Thus the design uses silicon diodes and transistors, but germanium or other semiconductor devices are also applicable as are vacuum tubes.

It will be apparent that most of the features of the present invention are as applicable to vacuum tube and amplifiers as to the transistorized embodiment shown.

The embodiments of the invention in which an exclusive property or privilege is claimed are defined as follows:

1. In an amplifier output stage having first and second transistors, the collector-emitter circuit of said first transistor being connected in series with a first resistance between a first power supply terminal and an output terminal with the collector connected to said output terminal, the collector-emitter circuit of said second transistor being connected in series with a second resistance between a second power supply terminal, the collector being connected to the supply terminal, and said output terminal, a load connected between said output terminal and a reference terminal, said first power supply terminal being of opposite polarity relative to said reference terminal than said second power supply terminal, means for applying an input signal current to the base of said first transistor, circuit means connecting the base of said second transistor to the collector of said first transistor, a third transistor having its base-emitter circuit connected to receive the voltage across said first resistance and its collector connected to apply current to the base of said first transistor to limit current flow through said first transistor, a fourth transistor having its base-emitter circuit connected to receive the voltage across said second resistance and its collector connected to apply current to the base of said second transistor to limit current flow through said second transistor, the combination of: first means connected to apply a current to the base of said third transistor commensurate in magnitude with the voltage across the collector-emitter circuit of said first transistor, and second means connected to apply a current to the base of said fourth transistor commensurate in magnitude with the voltage across the collector-emitter circuit of said second transistor, whereby the current levels at which current flow through said first and second transistors is limited varies in accordance with the voltages across the collector-emitter circuits of said first and second transistors.

2. The combination according to claim 1 wherein the base-emitter circuit of said third transistor is connected to receive said voltage across said first resistance via a first low-pass filter circuit, and wherein the base-emitter circuit of said fourth transistor is connected to receive said voltage across said second resistance via a second low-pass filter circuit.

3. The combination according to claim 1 wherein said first means comprises a resistance connected between the collector of said first transistor and the base of said third transistor, and wherein said second means comprises a resistance connected between the collector of said second transistor and the base of said fourth transistor.

* * * * *